United States Patent
Urban et al.

(10) Patent No.: US 9,930,220 B2
(45) Date of Patent: Mar. 27, 2018

(54) METHOD AND DEVICE FOR MAPPING COLORS IN A PICTURE USING TEMPLATES OF HARMONIOUS COLORS

(71) Applicant: THOMSON LICENSING, Issy de Moulineaux (FR)

(72) Inventors: Fabrice Urban, Thorigne Fouillard (FR); Christel Chamaret, Chantepie (FR); Yoann Baveye, Saint-Ave (FR)

(73) Assignee: THOMSON LICENSING SAS, Issy les Moulineux (FR)

( * ) Notice: Subject to any disclaimer, the term of this patent is extended or adjusted under 35 U.S.C. 154(b) by 0 days.

(21) Appl. No.: 14/273,727

(22) Filed: May 9, 2014

(65) Prior Publication Data
US 2014/0348421 A1 Nov. 27, 2014

(30) Foreign Application Priority Data

May 23, 2013 (EP) ..................... 13305665

(51) Int. Cl.
*H04N 1/60* (2006.01)
*G06T 11/00* (2006.01)
*G06T 7/11* (2017.01)
*G06T 7/194* (2017.01)

(52) U.S. Cl.
CPC ............ *H04N 1/6077* (2013.01); *G06T 7/11* (2017.01); *G06T 7/194* (2017.01); *G06T 11/001* (2013.01); *G06T 2207/10024* (2013.01)

(58) Field of Classification Search
None
See application file for complete search history.

(56) References Cited

U.S. PATENT DOCUMENTS

| 7,092,573 | B2 | 8/2006 | Luo et al. | |
|---|---|---|---|---|
| 7,840,068 | B2 * | 11/2010 | Knee et al. | 382/173 |
| 8,059,911 | B2 * | 11/2011 | Chen et al. | 382/266 |
| 8,254,679 | B2 | 8/2012 | Marchesotti | 382/173 |
| 8,717,405 | B2 * | 5/2014 | Li et al. | 348/14.08 |
| 8,942,469 | B2 * | 1/2015 | Moorty et al. | 382/159 |
| 2013/0106837 | A1 * | 5/2013 | Mukherjee et al. | 345/419 |
| 2013/0265382 | A1 * | 10/2013 | Guleryuz et al. | 348/14.08 |

(Continued)

OTHER PUBLICATIONS

Cohen-Or, Daniel, et al. "Color harmonization." ACM Transactions on Graphics (TOG). vol. 25. No. 3. ACM, 2006.*

(Continued)

*Primary Examiner* — Sumati Lefkowitz
*Assistant Examiner* — Jiangeng Sun
(74) *Attorney, Agent, or Firm* — Tutunjian & Bitetto, P.C.

(57) ABSTRACT

A method for processing a picture is disclosed. The method according to the invention comprises:
  segmenting the picture into a background layer and at least another layer;
  selecting a background template of color harmony for the background layer;
  determining one template of color harmony for each of the at least another layer from the background template of color harmony depending on the distance between the background layer and said at least another layer.
  processing the picture by mapping the colors of each segmented layer using the corresponding template of color harmony.

21 Claims, 3 Drawing Sheets

(56) References Cited

U.S. PATENT DOCUMENTS

2015/0030232 A1* 1/2015 Parkhomenko et al. ..... 382/154

OTHER PUBLICATIONS

Wan, Y; et al. Image Composition With Color Harmonization. International Journal of Pattern Recognition & Artificial Intelligence. 26, 3, -1, May 2012.*
Baveye et al., "Image and video saliency models improvement by blur identification." Computer Vision and Graphics. Springer Berlin Heidelberg, 2012, pp. 280-287.
Cohen-Or, Daniel, et al. "Color harmonization," ACM Transactions on Graphics (TOG), vol. 25, No. 3, ACM, 2006, pp. 1-7.
Mémin et al., "Hierarchical estimation and segmentation of dense motion fields." International Journal of Computer Vision, vol. 46, No. 2, (2002), pp. 129-155.
Sawhney et al., "Compact representations of videos through dominant and multiple motion estimation", Pattern Analysis and Machine Intelligence, IEEE Transactions on, vol. 18, No. 8 (1996), pp. 814-830.
Tong et al. "Blur detection for digital images using wavelet transform." Multimedia and Expo, 2004. ICME'04. 2004 IEEE International Conference on, vol. 1, IEEE, 2004, pp. 1-4.
Van De Weijer et al., "Learning color names for real-world applications", Image Processing, IEEE Transactions on, vol. 18, No. 7, Mar. 4, 2009, pp. 1512-1523.
Tang et al., "Colour harmonisation for images and videos via two level graph cut", IET Image Process 2011, vol. 5, Iss. 7, pp. 630-643.
Wang et al., "Image composition with color harmonization", Chinese Optics Letters, vol. 7, No. 6, Jun. 10, 2009, pp. 483-485.
Tokumaru et al., "Color design support system considering color harmony," Fuzzy Systems, 2002. FUZZ-IEEE'02. Proceedings of the 2002 IEEE International Conference on, vol. 1, IEEE, 2002, pp. 378-383.
Delon et al: "A non parametric approach for histogram segmentation", IEEE Transactions on Image Processing, Vol. 16, No. 1, January 2007, pp. 253-261.
Yoann Baveye etal: "Saliency-guided consistent color harmonization", Mar. 3, 2013, Computational Color Imaging, Springer Berlin, Heidelberg, pp. 105-118.
Xing Huo etal:"An improved method for color harmonization", Image and Signal Processing, 2009, CISP '09. 2nd International Congress on. IEEE, Piscataway, NJ, USA, Oct. 17, 2009, pp. 1-4.
Longhurst Peter etal: "A GPU based saliency map for high-fidelity selective rendering", ACM int. Conf. comput. graph. virtual reality proceddings of the 4th int'l Conf., Jan. 27, 2006, pp. 21-29.
Sawant N etal: "Color harmonization for videos", computer vision, graphics&image processing, 2008, Sixth Indian Conference on, IEEE, Dec. 16, 2008, pp. 576-582.
Zhen Tang etal: "Image composition with color harmonization", Image and Vision Computing New Zealand (IVCNZ), 2010 25th international conference of, IEEE, Nov. 8, 2010, pp. 1-8.
Search Report Dated September 19, 2013.

* cited by examiner

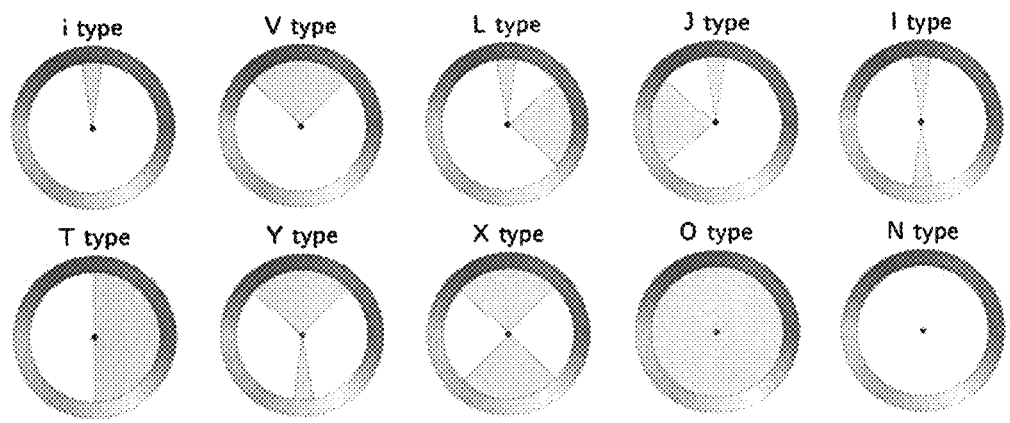
FIGURE 1 – STATE OF THE ART
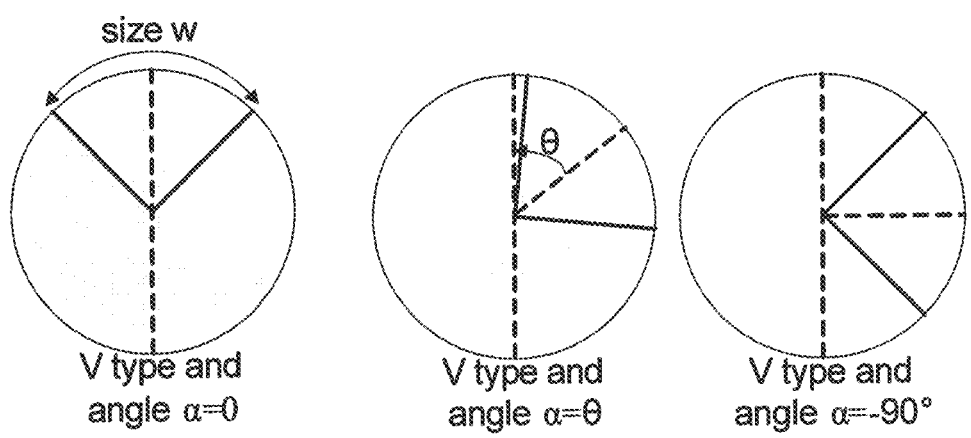
FIGURE 2

METHOD AND DEVICE FOR MAPPING COLORS IN A PICTURE USING TEMPLATES OF HARMONIOUS COLORS

This application claims the benefit, under 35 U.S.C. § 119 of European Patent Application No. 13305665.5, filed May 23, 2013.

1. FIELD OF THE INVENTION

The invention relates to a method and a device for processing a picture. More precisely, the picture processing method comprises mapping colors of the picture using a template of harmonious colors.

2. BACKGROUND OF THE INVENTION

It is known to correct colors in pictures or in some parts of the pictures to improve the perceptual experience. As an example, pictures with saturated colors are advantageously processed to remove these saturated colors and thus improve the perceptual experience.

Document entitled "*Color Harmonization*" from Cohen-Or teaches a method for harmonizing pictures based on harmonious templates $T_m$ ($m \in \{i, I, L, T, V, X, Y, N\}$). These templates of color harmony are depicted on FIG. 1. This method has the several drawbacks. First, it is not fully automatic and requires manual annotation for "sensitive" areas (typically skin or sky that look unnatural if they lose their original color). Second, color mapping is very basic. It maps color palette of the original picture by applying a Gaussian filter constraint in a template. Third, the whole picture or a selected part of this picture is harmonized in a same way, i.e. the same template is used.

3. BRIEF SUMMARY OF THE INVENTION

The purpose of the invention is to overcome at least one of the disadvantages of the prior art. A method for processing a picture is thus disclosed. The processing method comprises:
  segmenting the picture into a background layer and at least another layer;
  selecting a background template of color harmony for the background layer, a template being for example defined around the hue wheel by at least one sector of harmonious colors;
  determining one template of color harmony for each of the at least another layer from the background template of color harmony depending on the distance between the background layer and the at least another layer.
  processing the picture by mapping the colors of each segmented layers using the corresponding template of color harmony.

According to a first embodiment, determining one template for each of the at least another layer from the background template depending on a distance between the background layer and the at least another layer comprises increasing the size of each sector of the background template based on the distance, the template with sectors of increased size being the template for the at least another layer.

According to a specific characteristic of the invention, increasing the size of each sector of the background template based on the distance comprises:
  computing a distance between the background layer and the at least another layer;
  computing the increased size for each sector of the background template according to the following equation:

$$size_{exp} = size + \frac{size}{2 \cdot nb_{sec}} * \sqrt{abs\left(\frac{d_k}{d_f}\right)}$$

where $size_{exp}$ is the increased size, $nb_{sec}$ is the number of sectors in the background template and $d_f$ is a distance between the background layer and a foreground layer.

According to a variant embodiment, determining one template for each of the at least another layer from the background template depending on a distance between the background layer and the at least another layer comprises determining an intermediate template comprising a single sector whose size and angle are computed from the distance and determining the template for the at least another layer as the union of the background template and of the intermediate template.

According to a specific characteristic of the invention, the size of the single sector of the intermediate template is computed as follows $$size_\Psi = \frac{720}{S} * \sqrt{abs\left(\frac{d_k}{d_f}\right)}$$

where $d_k$ is a distance between the background layer and the at least another layer, S is the sum of the sizes of the sectors of the background layer and $d_f$ is a distance between the background layer and a foreground layer.

According to one aspect of the invention, segmenting the picture into a background layer and at least another layer comprises determining a depth value for each pixel or group of pixels in the picture and segmenting the picture on the basis of the depth values.

According to a variant, segmenting the picture into a background layer and at least another layer comprises determining a motion value for each pixel or group of pixels in the picture and segmenting the picture on the basis of the motion values.

According to a specific characteristic of the invention, the distance between the background layer and the at least another layer is equal to the difference between the mean of motion or depth values for the background and the mean of motion or depth values for the at least another layer.

A computer program product comprising program code instructions to execute the steps of the processing method according to the invention when this program is executed on a computer is further disclosed.

A processor readable medium having stored therein instructions for causing a processor to perform at least the steps of the processing method according to the invention is also disclosed.

A device for processing a picture is discloses that comprises:
  means for segmenting the picture into a background layer and at least another layer;
  means for selecting a background template for the background layer, a template defining at least one sector of harmonious color values;
  means for determining one template for each of the at least another layer from the background template depending on the distance between the background layer and the at least another layer.

means for processing the picture by mapping the colors of the picture using the corresponding templates.

The processing device is configured to execute the steps of the processing method.

4. BRIEF DESCRIPTION OF THE DRAWINGS

Other features and advantages of the invention will appear with the following description of some of its embodiments, this description being made in connection with the drawings in which:

FIG. 1 depicts eight harmonious color templates as defined in the prior art;

FIG. 2 depicts the V type harmonious template with different angles;

5. DETAILED DESCRIPTION OF THE INVENTION

An harmonious color template or a template of color harmony is for example a set of HSV values (hue, saturation and value) that are considered as rendering/reflecting a global harmonious effect when present at the same time. The ten harmonious color templates $T_m$ (m∈{i, I, L, T, V, X, Y, J, O, N}) depicted on FIG. 1 are examples of such templates of color harmony. The template O comprises only one color range having an arc-length 360°. This template is used in order to not harmonize frames containing all hues equally, like picture containing a rainbow for example. Each harmonious color template $T_m$ is made of different portions/sectors. Harmonious colors are close if they are in the same sector, or complementary if they are in an opposite sector. Templates J and L handle orthogonal harmonious hues. Each sector is defined by an angle α and a size w as depicted on FIG. 2. An harmonious color template may be turned around the hue wheel. Thus an harmonious color template $T_m$ is defined by a template type m and an angle $\alpha_m$.

Figure 3:
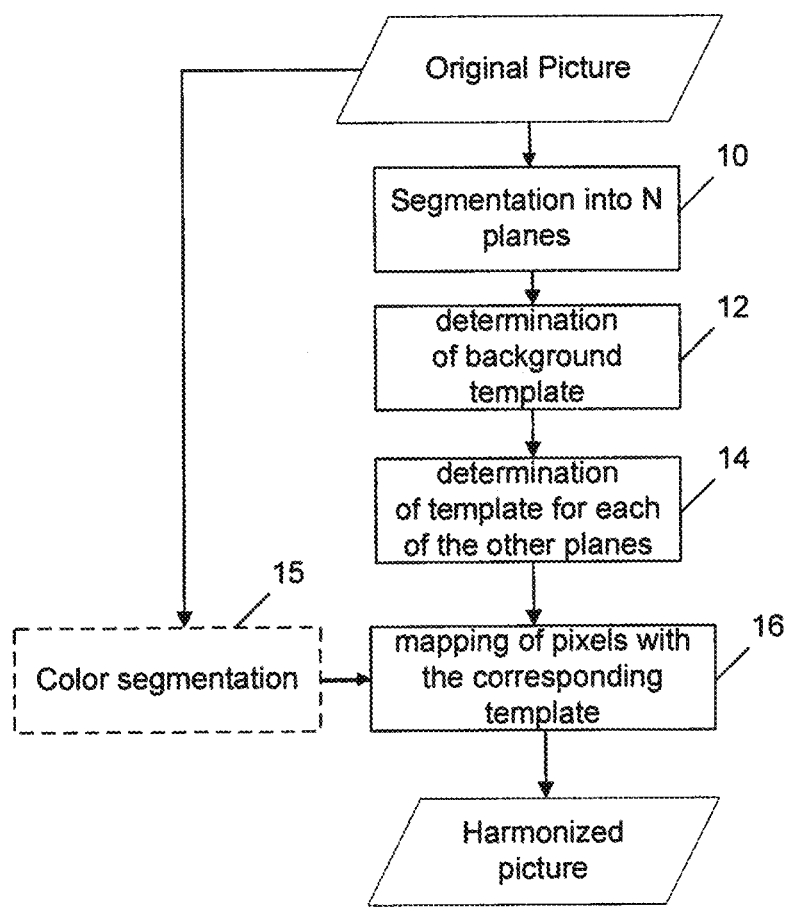
FIG. 3 depicts the flowchart of the processing method according to the invention.

FIG. 3 depicts the flowchart of the processing method according to a specific and non-limiting embodiment of the invention. Some of the steps of the method are optional. One can notice that the following method can be extended to video source by applying same process to consecutive frames.

At a step 10, the picture is segmented into a background layer and at least another layer, for example a background layer and a foreground layer. More generally, the picture is segmented into N layers $P_k$, with k=0 to N-1. The background is for example the layer of index k=0 while the foreground layer is the layer of index k=N-1.

As an example, a depth value is computed for each pixel or group of pixels in the picture. A depth map is thus obtained that is segmented into N layers. If N=2 then a background layer and a foreground layer are obtained. The depth map is for example thresholded with (N-1) thresholds Tr=maxDepth-maxDepth*r/(N-1), where r=0 to N-2 and maxDepth is the maximum depth value in the depth map. The depth map can be obtained using a depth sensor (for example of Kinect® type). In a variant, the depth map can be obtained by the method disclosed in the International application WO 2009/061305 published on May 14, 2009. It will be appreciated, however, that the invention is not restricted to these specific methods for obtaining the depth map.

In a variant, the depth map can be replaced by a blur map. Exemplarily, the blur map can be determined as disclosed in section 2.2 of the document from Baveye et al entitled "*Image and Video Saliency Models Improvement by Blur Identification*" published in ICCVG 2012. The blur map is then segmented into N layers. If N=2 then a background layer and a foreground layer are obtained (from the view point of blur, the background layer is the blurriest area). The blur map is for example thresholded with (N-1) thresholds Tr=maxBlur-maxBlur*r/(N-1), where r=0 to N-2 and maxBlur is the maximum blur value in the blur map. It will be appreciated, however, that the invention is not restricted to this specific method for obtaining the blur map.

According to a variant, a motion value is computed for each pixel or group of pixels in the picture. A motion map is thus obtained that is segmented into N layers. If N=2 then a background layer and a foreground layer are obtained (from the view point of motion). The method disclosed in the document from Mémin et al entitled "hierarchical estimation and segmentation of dense motion fields" published in International Journal of computer vision in 2002 can be used. A variant comprises determining the dominant motion. The document from Sawhney et al entitled "*Compact representations of videos through dominant and multiple motion estimation*" and published in IEEE Transactions on PAMI vol. 18 no 8 in August 1996 discloses in section 2.2 a way to determine dominant motion. The background is composed of the set of pixels having the dominant motion. In other words, if the motion of a pixel is the dominant motion, this pixel is considered to belong to the background. The N-1 other layers are segmented with the motion speed using Kmean algorithm. The layer with the motion speed the furthest from the motion speed of the background is considered to be the foreground. It will be appreciated, however, that the invention is not restricted to these specific methods for obtaining the motion map.

At a step 12, a background template $T_b$ is selected for the background layer. More precisely, a background template type b and a background template angle $\alpha_b$ are determined. One of the templates $T_m$ (m∈{i, I, L, T, V, X, Y, J, O}) depicted on FIG. 1 and defined in "Color Harmonization" from Cohen-Or is selected subject to a rotation by $\alpha_m$. Therefore, not only a template type is selected but a template type with an angle. The templates of type O is not used during this selection.

The color histogram M of the background layer of the original picture is computed in HSV space such as defined below in order to help choosing one template. It is the normalized hue distribution weighted by saturation and value:

$$M_j = \frac{1}{\Sigma_{(x,y)} S[x,y] * V[x,y]} * \sum_{(x,y) \in \{(u,v) \mid H[u,v]=j\}} S[x,y] * V[x,y]$$

j usually but not necessarily varies from 0 to 360.

Then, the appropriate template type b and the associated angle $\alpha_b$ that best fits the hue distribution M is chosen by minimizing the Kullback-Leibler divergence computed for each template type m and each angle α:

$$(b, \alpha_b) = \underset{m,\alpha}{\mathrm{argmin}} \sum_j M_j * \ln\left(\frac{M_j}{P_j(m, \alpha)}\right)$$

where $P(m, \alpha)$ is the distribution of template m for the angle $\alpha$. $P_j(m, \alpha)$ represents the bin j of the distribution. Here $P(m, \alpha)$ typically represents a harmonized model, description, or approximation of M. The distribution $P(m, \alpha)$ can be uniform in each sectors/portions of HSV values and null elsewhere or can be a bump function. The invention is not limited by the way the distribution is defined. According to a variant, the template $T_b$ and the associated angle $\alpha_b$ are selected such that it matches the hue distribution M, i.e. such that the Kullback-Leibler divergence $$d_b = \Sigma_j M_j * \ln\left(\frac{M_j}{P_j(b, \alpha_b)}\right)$$

is below a threshold value, where $b \in \{i, I, L, T, V, X, Y, J, O\}$. In this case, the template is not necessarily the one that best fits the hue distribution M, but it is close to the hue distribution M.

At a step 14, a template is determined for each of the other layers $P_k$. The template is determined from the background template depending on a distance $d_k$ computed between the background layer and the other layer $P_k$. The template is determined for a current layer $P_k$ by increasing the size of the background template, more precisely by increasing the size $size_b$ of each sector of the template. In this case, the angle remains unchanged. The size $w_m$ of each sector of each template is precisely defined in the paper from Cohen et al. For example, the size of the sector of template of type i is 18°. The idea of this expansion is to weight this size $size_b$ of each sector with a "distance" from the current layer to the background so that the size increases progressively from the background to the foreground layer. The size of all sectors in the background template is increased as follows:

$$size_{exp} = size_b + \frac{size_b}{2 \cdot nb_{sec}} * \sqrt{\mathrm{abs}\left(\frac{d_k}{d_f}\right)}$$

where $size_{exp}$ is the increased size, $nb_{sec}$ is the number of sectors in the background template and $d_f$ is the distance between the foreground layer and the background layer (i.e. the closest layer, i.e. $P_{N-1}$). As an example, the distance $d_k$ is defined as the difference between $\mu_{back}$ the mean of depth/speed values of background pixels and $\mu_k$ the mean of depth/speed values of current layer pixels and $d_f$ is defined as the difference between $\mu_{back}$ the mean of depth/speed values of background pixels and $\mu_f$ the mean of depth/speed values of foreground layer pixels. In the case where $\mu_{back}$, $\mu_k$ and $\mu_f$ values are not accurate, and if the background is the layer of index k=0 while the foreground layer is the layer $P_{N-1}$, it is possible to use another distance which is less sensitive to computational noise. According to this variant, the size is computed as follows:

$$size_{exp} = size + \frac{size}{2 \cdot nb_{sec}} * \frac{k}{N-1}$$

The sector expansion is less efficient if the hue values of an important number of pixels in the current layer are not contained in the enlarged template. Indeed, the goal of the expansion is to preserve colors in the foreground layers. However, if the hue values of an important number of pixels in the current layer are not contained in the enlarged template, they need to be shifted in the template. Consequently the corresponding foreground layers are widely modified. The following variant solves this problem.

According to a variant, a template is determined for a current layer $P_k$ as a union of the template of the background $T_b$ and of an intermediate template of type $\Psi$ and of angle $\alpha_f$ computed for the current layer. This intermediate template $\Psi$ is composed of only one sector but its size $size_\Psi$ depends on the "distance" from current layer to the background as in the previous variant but also on the size(s) of the sector(s) in $T_b$. Once the size is computed, the angle $\alpha_f$ is determined as the angle maximizing the Kullback-Leibler divergence computed only for template $\Psi$ on the pixels of the current layer as follows:

$$\alpha_f = \underset{\alpha}{\mathrm{argmin}} \sum_i M_i * \ln\left(\frac{M_i}{P_i(\Psi, \alpha)}\right),$$

According to a variant, the angle $\alpha_f$ is constrained so that the unified template has at most 2 sectors. Therefore, the unified template is closest to the eight original templates depicted on FIG. 1. If the template computed on the background has two sectors, the angle $\alpha_f$ is determined so that the template ($\Psi$, $\alpha_f$) is positioned next to one of the borders of a sector of $T_b$. The template ($\Psi$, $\alpha_f$) is defined as follows:

$$size_\Psi = \frac{720}{size_1} * \sqrt{\mathrm{abs}\left(\frac{d_k}{d_f}\right)}$$

and $\alpha_f \in \{0, 360\}$ if $b \in \{i, T, V\}$; otherwise $$size_\Psi = \frac{720}{size_1 + size_2} * \sqrt{\mathrm{abs}\left(\frac{d_k}{d_f}\right)}$$

and $$\alpha_f \in \left\{\alpha_b \pm \left(\frac{size_1 + size_\Psi}{2}\right)\right\} \cup \left\{(\alpha_b + 180) \pm \left(\frac{size_2 + size_\Psi}{2}\right)\right\}$$

where $size_1$ is the size of the first sector of $T_b$, $size_2$ is the size of the second sector.

Both variants deform the template which is no longer a harmonious template. However, $\alpha_f$, is not changed during this step. It provides more flexibility in the pixel mapping process while hues are contracted near the same center as for the background which brings colors unity.

Since the template of the other layers are determined from the background template depending on their relative distance to this background layer, the objects are better integrated into the background. In addition, the layers are gradually harmonized. Important colors of the objects are taken into account in the second variant because the background template is merged with the template P computed on the pixels in intermediate layers.

At step 16, the pixels of the original picture are mapped into the corresponding template, i.e. pixels of the background are mapped using the background template and pixels of layer $P_k$ are mapped using the template determined at step 14 for this layer $P_k$. More precisely, the outliers (in the sense that they are outside the selected template) are mapped into the harmonious sector(s) or close to by applying hue mapping functions.

Figure 4:
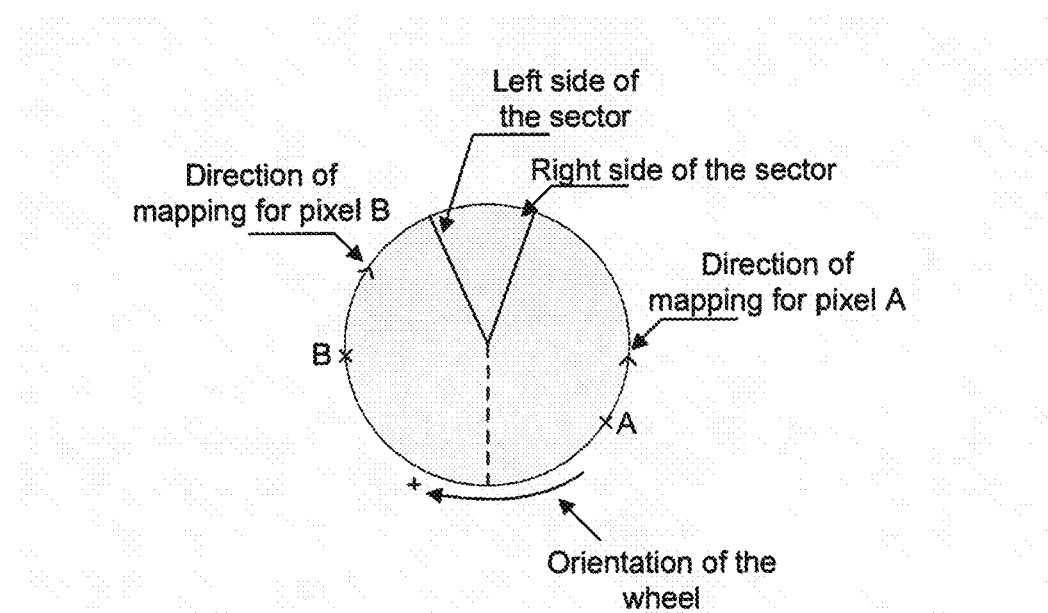
FIG. 4 represents a hue wheel and mapping directions of two pixels A and B.

A sigmoid function is used to map the hue of each pixel p:

$$H'(p) = C(p) + \text{Sgn} * \frac{w}{2} * \tanh\left(\frac{2*\|H(p) - C(p)\|}{w}\right)$$

where C(p) is the central hue of the sector associated with p, w is the arc-width of the template sector and $\|\ \|$ refers to the arc-length distance on the hue wheel and Sgn is the sign associated with the direction of mapping. A pixel is for example mapped on a sector side that is the closest. As depicted on FIG. 4, the pixel A is for example mapped on the right side of the sector since it is the closest side while pixel B is mapped on the left side of the sector. The hue wheel being oriented, Sgn is positive when the direction of mapping and the orientation of the wheel are in opposite direction (case of pixel A) while the Sgn is negative (case of pixel B) otherwise. According to the invention, the direction of mapping for a given pixel is not necessarily determined so that the pixel is mapped in the closest side of the sector. This sigmoid has good attributes for pixel mapping. Its asymptote in extreme value auto-clamp pixels in the template and its middle section (normal behavior) is nearly linear so at the center of a sector, hues are not changed. The proposed mapping function guarantees original hue values at the center of the harmonious sectors and compresses more strongly hue values outside the template. The harmonic colors are preserved, and only non-harmonic hues are modified.

However skin and sky areas are not natural when modified in the pixel mapping step 16 disclosed above. Indeed, some artifacts may be created during this step because two neighboring pixels that have similar colors can be mapped in opposite directions and consequently in opposite sides of a same sector or in different sectors. According to another embodiment, to remove these artifacts, a segmentation map of the original picture is determined at an optional step 15 and is used during the step 16 to ensure that all pixels in the same segmented area of the segmentation map are mapped with the same direction of mapping and thus in the same sector. This direction of mapping is for example the one mostly assigned to these pixels in a given segmented area. This direction of mapping is stored for example in a direction mapping map that associates with each pixel the direction of mapping of its segmented area. The segmentation map defines different regions in the original image that have close colors. Any method providing such a map can be used. An example of such algorithm is disclosed in the paper from Van de Weijer et al entitled "*learning color names for real world applications*" published in IEEE Transactions in Image processing in 2009. For color harmonization, the spatial aspect of the color segmentation is not compulsory. Therefore, a histogram segmentation technique is adequate here, such as the popular K-means method. However, such histogram segmentation should respect the following constraints:

It should be unsupervised, meaning that the final number of color clusters should not be a parameter. As a matter of fact, the color harmonization would be very sensitive to an incorrect number of meaningful colors.

The histogram segmentation technique should be capable of segmenting small modes of the histogram. In other words, small regions that could be seen as color outliers should be detected as separate modes.

In order to meet these requirements, a color segmentation method is disclosed that build on the work of Delon et al. referred to as ACoPa (Automatic Color Palette) and disclosed in the paper entitled "*A nonparametric approach for histogram segmentation*" published in IEEE Transactions on Image Processing, 16(1):253-261, 2007. This color segmentation technique is based on a contrario analysis of the color histogram modes. A statistical estimation of meaningful histogram modes is performed. Instead of the hierarchical estimation of modes in the H, then S, then V space, a histogram decomposition of each component is performed independently. The obtained modes are combined from all modes obtained, and segments with a very limited group of pixels are discarded. Finally, based on these histograms modes, a K-means post-processing is used to group the modes that are perceptually similar using a dictionary expressed in the Lab color space.

This segmentation technique is approximately 10 times faster than the original version. Besides, it deals more efficiently with achromatic pixels. Using a non-spatial algorithm allows to treat all pixels having the same colors without a priori on their position.

The segmentation is not perfect and some artifacts may appear at borders of segmented areas if each area has a different direction of mapping while their colors are originally close. These artifacts appear only on frontiers of segmented areas that undergo a hue mapping in opposite directions.

According to another embodiment, a post processing step is thus applied which blurs pixels at borders thanks to an average filter in order to overcome the above problem. Concerned frontiers are detected thanks to a gradient filter applied on the direction mapping map to get a mask identifying pixels to be blurred. The mask is used to blur the corresponding pixels in the modified hue picture obtained at step 16. The number of pixels to be blurred depends on the amount of blur at this location in the source picture. Indeed originally sharp areas have not to be blurred, which could be disturbing. The amount of blur is for example computed based on the method disclosed in document from H. Tong, M. Li et al entitled "*Blur detection for digital images using wavelet transform*," IEEE International Conference on Multimedia & Expo, IEEE Press, pp. 17-20, 2004.

Figure 5:
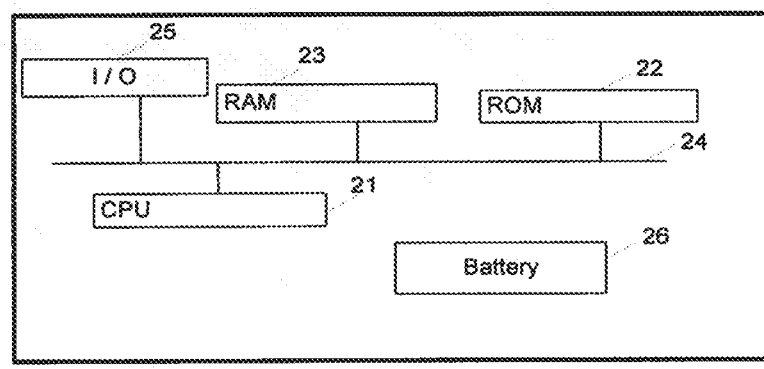
FIG. 5 depicts a processing device according to the invention.

FIG. 5 represents an exemplary architecture of a processing device 2 according to a specific and non limiting embodiment. The processing device can be for example a tablet, a PDA or a cell phone. Processing device 2 comprises following elements that are linked together by a data and address bus 24:

a microprocessor 21 (or CPU), which is, for example, a DSP (or Digital Signal Processor);

one or several memories 22, e.g. RAM (or Random Access Memory) and/or ROM (or Read Only Memory);

one or several Input/Output interface(s) 25, for example a keyboard, a mouse; and a battery 26.

Each of these elements of FIG. 3 are well known by those skilled in the art and won't be disclosed further. The processing device 2 may comprise display means such as a screen for displaying the processed pictures. In each of mentioned memory, the word «register» used in the specification can correspond to area of small capacity (some bits) or to very large area (e.g. a whole program or large amount of received or decoded data). According to a particular embodiment, algorithms of the processing method according to the invention are stored in the ROM 22. RAM 23 comprises in a register, the program executed by the CPU 21 and uploaded after switch on of the processing device 2. When switched on, the CPU 21 uploads the program in the RAM and executes the corresponding instructions. The pictures to be processed are received on one of the Input/Output interfaces 25. One of the Input/Output interface 25 is adapted to transmit the pictures processed according to the invention.

According to variants, processing devices 2 compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The invention claimed is:

1. A method for processing a picture comprising:
   segmenting the picture into a background layer and at least another layer;
   selecting a background template of color harmony for the background layer;
   determining one template of color harmony for each of the at least another layer from the background template of color harmony based on a determination of a distance $d_k$ between the background layer and said at least another layer; and
   processing the picture by mapping the colors of each segmented layer using the corresponding template of color harmony.

2. The method according to claim 1, wherein each template of color harmony is defined around a hue wheel by at least one sector of harmonious colors.

3. The method of claim 2, wherein said determining further comprises increasing a size, $size_b$, of each sector of the background template of color harmony based on said distance $d_k$, the template of color harmony with sectors of increased size being the template of color harmony for said at least another layer.

4. The method of claim 3, wherein said increasing further comprises computing the increased size for each sector of said background template of color harmony according to the following equation:

$$size_{exp} = size + \frac{size}{2 \cdot nb_{sec}} * \sqrt{\text{abs}\left(\frac{d_k}{d_f}\right)}$$

where $size_{exp}$ is the increased size, $nb_{sec}$ is the number of sectors in the background template of color harmony, and $d_f$ is the distance between said background layer and a foreground layer.

5. The method of claim 2, wherein said determining further comprises:
   determining an intermediate template of color harmony comprising a single sector whose size and angle are computed from said distance; and
   determining the template of color harmony for said at least another layer as the union of said background template of color harmony and of said intermediate template of color harmony.

6. The method of claim 5, wherein a size $size_\Psi$, of the single sector of the intermediate template of color harmony is computed as follows:

$$size_\Psi = \frac{720}{S} * \sqrt{\text{abs}\left(\frac{d_k}{d_f}\right)}$$

where S is the sum of the sizes of the sectors of the background layer and $d_f$ is the distance between said background layer and a foreground layer.

7. The method according to claim 1, wherein said segmenting further comprises determining a depth value for each pixel or for each group of pixels in the picture and segmenting the picture on the basis of said depth values.

8. The method according to claim 7, wherein the determined distance $d_k$ between the background layer and said at least another layer is equal to the difference between the mean of depth values for the background and the mean of depth values for the at least another layer.

9. The method according to claim 1, wherein said picture belongs to a video and wherein segmenting the picture into a background layer and at least another layer comprises determining a motion value for each pixel or for each group of pixels in the picture and segmenting the picture on the basis of said motion values.

10. The method according to claim 9, wherein the determined distance $d_k$ between the background layer and said at least another layer is equal to the difference between the mean of motion values for the background and the mean of motion values for the at least another layer.

11. A non-transitory program storage device, readable by a computer, tangibly embodying a program of instructions executable by a computer to perform a method comprising:
   segmenting the picture into a background layer and at least another layer;
   selecting a background template of color harmony for the background layer;
   determining one template of color harmony for each of the at least another layer from the background template of color harmony based on a determination of a distance $d_k$ between the background layer and said at least another layer; and
   processing the picture by mapping the colors of each segmented layer using the corresponding template of color harmony.

12. A device for processing a picture comprising at least one processor configured to:
   segment the picture into a background layer and at least another layer;
   select a background template of color harmony for the background layer;
   determine one template of color harmony for each of the at least another layer from the background template of color harmony based on a determination of a distance $d_k$ between the background layer and said at least another layer; and
   process the picture by mapping the colors of each segmented layer using the corresponding template of color harmony.

13. The device according to claim 12, wherein each template of color harmony is defined around a hue wheel by at least one sector of harmonious colors.

14. The device of claim 13, wherein for determining one template of color harmony for each of the at least another layer from the background template of color harmony based on the determined distance $d_k$ between the background layer and said at least another layer, the processor is further configured to increase a size, $size_b$, of each sector of the background template of color harmony based on said distance, the template of color harmony with sectors of increased size being the template of color harmony for said at least another layer.

15. The device of claim 14, wherein for increasing the size, $size_b$, of each sector of the background template of color harmony based on said distance $d_k$, said processor is further configured to compute the increased size for each sector of said background template of color harmony according to the following equation:

$$size_{exp} = size_b + \frac{size_b}{2 \cdot nb_{sec}} * \sqrt{abs\left(\frac{d_k}{d_f}\right)}$$

where $size_{exp}$ is the increased size, $nb_{sec}$ is the number of sectors in the background template of color harmony, and $d_f$ is the distance between said background layer and a foreground layer.

16. The device of claim 13, wherein for determining one template of color harmony for each of the at least another layer from the background template of color harmony based on the determined distance $d_k$ between the background layer and said at least another layer, said processor is further configured to:
  determine an intermediate template of color harmony comprising a single sector whose size and angle are computed from said distance; and
  determine the template of color harmony for said at least another layer as the union of said background template of color harmony and of said intermediate template of color harmony.

17. The device of claim 16, wherein a size $size_\Psi$, of the single sector of the intermediate template of color harmony is computed as follows $$size_\Psi = \frac{720}{S} * \sqrt{abs\left(\frac{d_k}{d_f}\right)}$$

where S is the sum of the sizes of the sectors of the background layer and $d_f$ is the distance between said background layer and a foreground layer.

18. The device according to claim 12, wherein in segmenting the picture into a background layer and at least another layer the processor is further configured to determine a depth value for each pixel or for each group of pixels in the picture and segment the picture on the basis of said depth values.

19. The device according to claim 18, wherein the determined distance $d_k$ between the background layer and said at least another layer is equal to the difference between the mean of depth values for the background and the mean of depth values for the at least another layer.

20. The device according to claim 12, wherein said picture belongs to a video and wherein for segmenting the picture into a background layer and at least another layer the processor is further configured to determine a motion value for each pixel or for each group of pixels in the picture and segment the picture on the basis of said motion values.

21. The device according to claim 20, wherein the distance between the background layer and said at least another layer is equal to the difference between the mean of motion values for the background and the mean of motion values for the at least another layer.

* * * * *